Sept. 26, 1933.  J. R. PHEAZEY  1,927,845
SUBMARINE CABLE
Filed Jan. 2, 1931

INVENTOR
JOHN R. PHEAZEY
BY
Joseph L. Knight
ATTORNEY

Patented Sept. 26, 1933

1,927,845

UNITED STATES PATENT OFFICE 1,927,845

SUBMARINE CABLE

John Richard Pheazey, Uozaki, Muko-Gun, Hyogo-Ken, Japan, assignor to International Standard Electric Corporation, New York, N. Y., a corporation of Delaware Application January 2, 1931, Serial No. 506,289, and in Great Britain January 7, 1930

6 Claims. (Cl. 173—266)

This invention relates to lead covered submarine cables having stranded solid segments of reinforcement for the lead sheath.

It is a well known fact that paper insulated telephone cables are superior from the standpoint of speech transmission to cables insulated with other materials and for this reason almost all land cables are paper insulated.

Paper insulation, however, is not widely employed as a dielectric for submarine cables and this may be due partly to the fact that when the lead covering is damaged the trouble is widely spread and repair is very difficult. Another defect is that such dielectric on submarine cables would permit the deformation of the latter at great sea depths where the pressure is excessive. When depth does not exceed a certain limit cables may be made to withstand water pressure by increasing the thickness of the lead covering, but this practice has heretofore usually been limited to places where the depth does not exceed approximately 50 fathoms.

An object of the present invention is to provide a lead covered submarine cable which as regards the above defects is improved.

According to the invention the cable comprises a plurality of reinforcing segments which are stranded together to form a solid strand and the conductors or groups of conductors are accommodated in interstices formed between the segments.

According to another feature a pin wire (preferably of steel) is inserted at the center of the cable.

The invention will be described with reference to the accompanying drawing in which.

Figure 1:
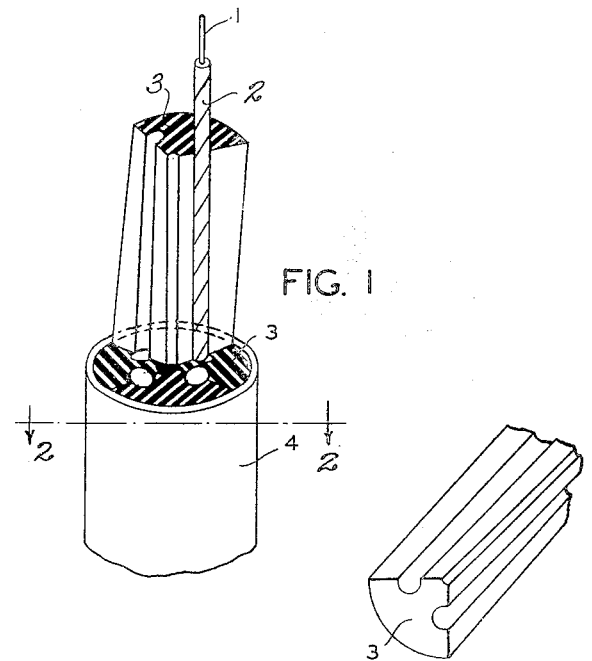
Fig. 1 illustrates in perspective a lead covered cable according to the present invention.
Figures 2, 3:
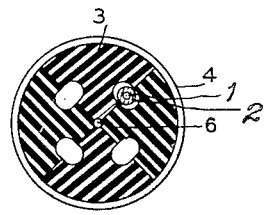
Fig. 2 is a cross section of the cable of Fig. 1
Fig. 3 is a perspective of one of the solid segments also shown in Figs. 1 and 2.

The invention is explained with reference to the drawing. In Fig. 1, 1 is a conductor or group of conductors insulated with paper 2 and 3 represents the stranded solid segments which constitute the reinforcement for the lead sheath 4. Each segment has two interstices or grooves of semi-circular shape for receiving conductors or groups of conductors, each groove being cut in each of its faces which come in contact with adjacent segments. The position and the number of grooves in each segment may be changed if desired. In order to avoid confusion, the lead sheath and the parts within it only which are necessary for this invention, are shown. Steel armour will of course be provided over the lead sheath. In the drawing an instance is shown in which four conductors or groups of conductors are used, but the number of conductors or groups of conductors may be changed to suit requirements. Moreover a layer or layers of segments and conductors may be applied over a central combination of the two in order to increase the number of circuits within the cable.

An important feature is that the reinforcement segments are stranded together. A strand so made is a mechanically stable unit which is capable of withstanding twisting strains without appreciable deformation. The conductors are stranded coincidently with the stranding of the segments and are laid into the interstices formed by the grooves in two adjacent segment faces being brought together. The segments and the conductors or groups of conductors are all stranded or twisted with the same pitch and in the same direction.

Usually the surfaces of the segments will be in direct contact with the lead sheath but metallic or other tapes may be applied helically between the strand and lead sheath, if desired.

Although in some submarine cables hollow segments of reinforcement have been used heretofore, these cables have been accompanied by the demerit that, when kinks are produced in them while being laid at or pulled up from, sea bottom, the segments crack and damage the lead covering. There is no such demerit for the cable covered by this invention, since all the segments of reinforcement are solid and stranded together. It has a further merit, when a metal or its alloy is used for the segments, in that no inductive interference is produced between the circuits since each conductor or group of conductors in the cable is completely screened from all other conductors or groups of conductors, so that the cable is best suited for the long distance transmission of speech.

There is always a tendency for the segments to slide over each other during the laying of the cable and although this tendency is reduced by allocating the conductors according to the present invention, it might be also reduced by the addition of a steel pin wire inserted at the center of the cable. In this case the corner of each segment at the center would be removed so as to provide a groove 6 adapted to accommodate the pin wire.

Although in the preferred arrangement the segments 3 are of metal such as aluminium or aluminium alloy, it might also be desirable in certain cases to use instead segments of a rigid non-metallic material such as many of the dielectric materials now obtainable as a commercial product.

What is claimed is:

1. In a submarine electric signalling cable the combination of a lead sheath, a plurality of reinforcing segments stranded together within said lead sheath, cooperating longitudinal grooves in said segments forming substantially circular channels throughout the cable, and a plurality of insulated conductors in said channels completely surrounded by said segments.

2. In a submarine electric signalling cable the combination of a plurality of solid segments stranded together to form a cylindrical cable, at least one longitudinal groove in each segment adapted to cooperate with a similar groove in an adjacent segment to form a substantially circular channel, an insulated conductor in said channel completely surrounded by said segments, and means for holding said segments together.

3. In a submarine electric signalling cable the combination of a plurality of metal segments stranded together to form a cylindrical cable, longitudinal grooves in each segment adapted to cooperate with similar grooves in adjacent segments to form a plurality of channels extending through the cable, insulated conductors in said channels completely surrounded by said segments and an outer sheath for holding said segments together.

4. In a submarine electric signalling cable the combination of a plurality of solid segments, longitudinal grooves in each segment adapted to cooperate with similar grooves in adjacent segments to form a plurality of channels extending through the cable, said segments being stranded together to form a cylindrical cable and whereby said channels are caused to assume helical paths through the cable, insulated conductors in said helical channels completely surrounded by said segments and an outer sheath for holding said segments together.

5. In a submarine electric signalling cable the combination of a plurality of metal segments, longitudinal grooves in each segment adapted to cooperate with similar grooves in adjacent segments to form a plurality of channels extending through the cable, said segments being stranded together to form a cylindrical cable and whereby said channels are caused to assume helical paths through the cable, paper insulated conductors in said helical channels completely surrounded by said segments and a lead outer sheath for holding said segments together.

6. A cable according to claim 4, wherein said segments are stranded around a central wire located in a central channel formed by cooperating grooves in said segments.

JOHN RICHARD PHEAZEY.